United States Patent

[11] 3,619,625

[72] Inventor Robert E. Wood
Ann Arbor, Mich.
[21] Appl. No. 792,281
[22] Filed Jan. 21, 1969
[45] Patented Nov. 9, 1971
[73] Assignee Sycor Inc.
Ann Arbor, Mich.

[54] TAPE RECORDER APPARATUS WITH OPTICAL SENSING MEANS FOR TAPE CONTROL
18 Claims, 8 Drawing Figs.

[52] U.S. Cl. .......... 250/219 F, 179/100.25, 274/4 C, 250/227
[51] Int. Cl. .......... G11b 5/00
[50] Field of Search .......... 250/219, 219 F, 227; 179/100.2 D, 100.2 Z, 100.2 S; 274/48 C, 48 E, 48 F, 48 G, 11 C, 11 B; 242/55.12

[56] References Cited
UNITED STATES PATENTS

| | | | |
|---|---|---|---|
| 2,926,860 | 3/1960 | Pomarico | 242/55.12 X |
| 3,249,758 | 5/1966 | De Luca et al. | 250/219 |
| 3,497,157 | 2/1970 | Hanes et al. | 274/4 X |
| 3,037,093 | 5/1962 | Nowlan | 179/100.2 X |
| 2,324,304 | 7/1943 | Katzman | 250/227 |
| 2,952,416 | 9/1960 | Sampson | 250/269 |

*Primary Examiner*—Walter Stolwein
*Attorney*—Price, Heneveld, Huizenga & Cooper

ABSTRACT: A tape recorder/reproducer apparatus, generally including spindles for mounting recording tape reels and drive means for moving the tape from one reel to the other, and particularly including light sources and light sensors positioned immediately beneath the position of the tape and light guide means for directing the light from such source to that portion of tape positioned between the reels and back to one sensor, and also with light guide means for directing light from such source to the tape wound on one of the reels and back to another such sensor, for extremely accurate, automatic recording and reproducing control functions with respect to tape position.

INVENTOR.
ROBERT E. WOOD
BY Price, Heneveld Huizenga & Cooper
ATTORNEYS

INVENTOR.
ROBERT E. WOOD
BY Price, Heneveld
Huizenga & Cooper
ATTORNEYS

INVENTOR
ROBERT E. WOOD
BY Price, Heneveld Huizenga & Cooper
ATTORNEYS

TAPE RECORDER APPARATUS WITH OPTICAL SENSING MEANS FOR TAPE CONTROL

BACKGROUND

This invention relates generally to tape recording apparatus, and more particularly to means for automatically and precisely determining tape position criteria in recording apparatus; more particularly still, the invention relates to such means in connection with tape recorder apparatus of the type which uses tape magazines or cartridges, particularly those of the type which have come to be widely known as "cassettes," and to the accurate sensing of tape position criteria in the use of such cartridges.

Tape cartridges of the "cassette" type have come to be very widely used in relatively recent times, particularly in the popular music and home entertainment areas. As such, the cassettes are used to record and replay audio information, consisting basically of music and speech. The widespread popularity of the cassettes is due primarily to the fact that they are so easy to use; that is, the cassette is a generally flat, rectangular plastic case which completely encloses the tape, and which therefore completely dispenses with the usual necessity of mounting individual tape reels, threading the tape past the recording heads and through the guides, etc. In separably associated with this ease of use is the fact that, because the tape itself is no longer actually handled, it is not subject to damage.

While the popularity and usage of cassettes and cassette-type recording equipment has thus spread rapidly in recent times, all such use has been devoted strictly to recording and replaying sound. In very recent times, however, the somewhat surprising proposal has been advanced of utilizing ordinary commercial cassette magazines in sophisticated electronic data entry and handling systems and equipment. Because the cassettes do provide very significant advantages, particularly in the area of tape handling and storage, this proposal has been very favorably received by those in the data processing field. The actual usage of the cassette in such an application involves many problems, however, since extremely accurate drive and positioning of the totally enclosed and relatively inaccessible tape inside the cassettes are essential in the latter area, whereas such factors are not in any sense critical in the field of audio recording.

SUMMARY

The present invention is addressed to the problem of obtaining precise tape positioning criteria in the use of cassette tape cartridges in electronic data processing applications. Basically, the problem is to automatically sense and thereby "known" with complete accuracy and precision the point at which a particular one of a pair of trains of binary-type information begins on the tape enclosed within the cassette, depending upon which direction the tape is driven. Such point may be determined by sensing two factors: the point at which information of some type is present on the tape itself, and which of the two reel means in the cassette is full and which is empty, so that the particular end of the recording present on the tape can be recognized. The present invention accomplishes these purposes through the provision of optical sensing means which monitor the tape.

Briefly stated, the present invention provides tape recorder/reproducer apparatus of the type which utilizes cassette-type tape cartridges, and sensing means for monitoring tape movement between the reeling means within the cassette, and for monitoring the amount of tape wound upon one of the aforesaid reel means. The sensing means are optical in nature, and include light sources and light sensors or pickups, as well as light guide means for accurately directing the light from the sources to the particular tape presence points desired to be monitored. In one case, the light guide means comprise spaced, upstanding light-conductive post elements which traverse the plane of the cassette and have light-transmission portions positioned on either side of the tape moved within the cassette, between the reel means thereof. In the other case, the light guide means comprise light tubes which impinge the light from the source upon the tape wound upon one of the reel means, at a point radially spaced from the rotational axis of the reel means, from where light not obstructed by such tape is reflected back downwardly to activate a corresponding pickup.

DRAWINGS

PREFERRED EMBODIMENT

Figures 1, 2, 3:
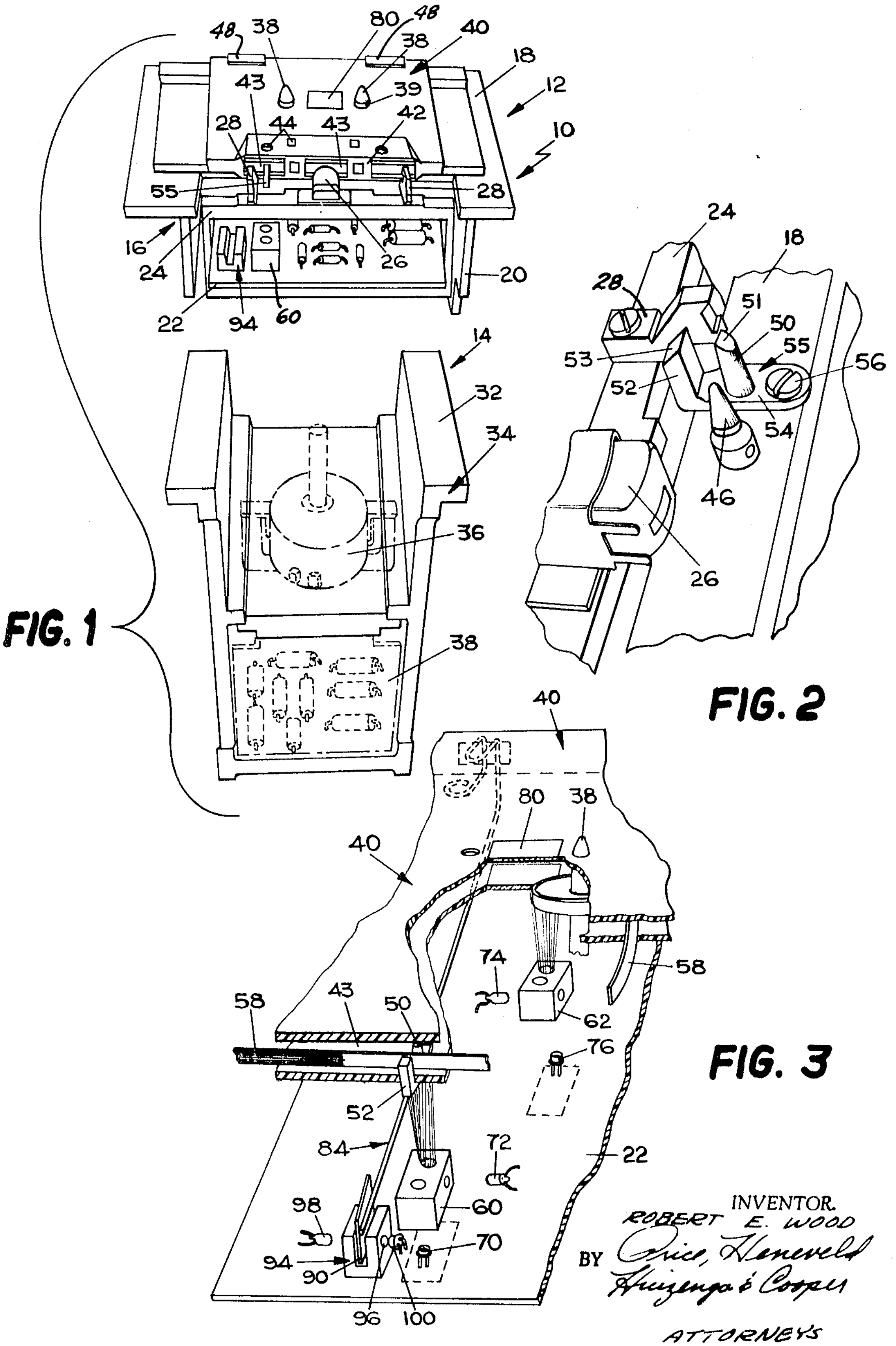
FIG. 1 is an exploded frontal perspective view of the recorder/reproducer apparatus.
FIG. 2 is an enlarged, fragmentary perspective view of the tape deck.
FIG. 3 is an enlarged, fragmentary perspective view showing a portion of a cassette and corresponding optical elements of the invention.
Figure 4:
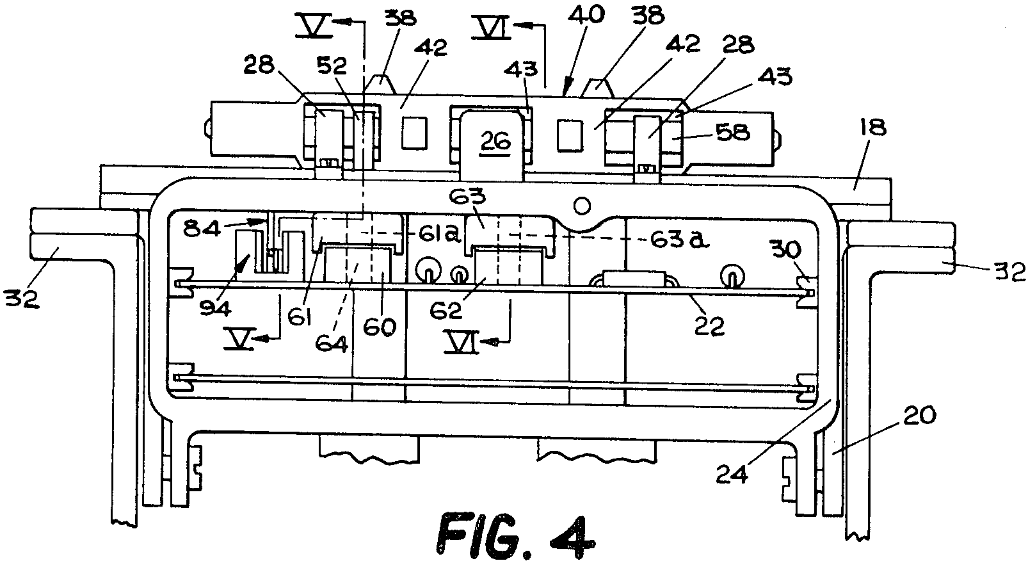
FIG. 4 is an enlarged, fragmentary front elevation of the recording deck.

The recorder/reproducer apparatus is illustrated generally in FIG. 1, wherein it is designated generally by the numeral 10. The apparatus 10 basically is comprised of an upper section 12, which includes the tape deck as referred to herein and the optical sensing system, and a lower section 14, which includes the drive and motor-control circuitry and components. The present invention is devoted to the upper portion 12 of the apparatus, i.e., the tape deck and optical system; however, for continuity and overall understanding the lower or drive portion 14 is also generally illustrated in this figure. Basically, the upper section 12 of the apparatus has its own individual frame 16, which forms both a generally flat platform or table section 18 and downwardly-depending wall portions 20, which are essentially perpendicular to the table 18. Between the walls 20 and beneath the table 18 are interior wall sections 25 (FIGS. 4 and 5) defining a rectangular enclosure in which circuit boards 22 are mounted, in a position generally parallel to the table 18. A pivotal head arm 24 defining a generally rectangular frame forms an outward extension of such interior walls, and serves as a mount for a recording and reproducing tape head 26 and a pair of spaced tape guides 28. The head arm 24 is pivotally mounted at its lower extremity to the interior walls 25 (FIG. 4). Circuit boards 22 are retained by suitable guides 30 (FIG. 4) attached to the interior walls 25.

As illustrated, the table or platform 18 of the upper section 12 extends laterally beyond the downwardly depending walls 20, and these outwardly extending portions of the table section rest upon the upper extremities 32 of the frame 34 for the lower section 14 (FIGS. 1 and 4) when the upper and lower sections are assembled, at which time the downwardly depending walls 20 of the upper section fit inside the vertical walls of the lower frame 34. As stated, the lower section 14 includes the drive components and motor control circuitry, and a typical drive motor is pictorially illustrated in phantom at 36. In such an arrangement, the motor control circuitry may be embodied in printed circuit boards 38 mounted near the bottom of this lower section 14. The particular drive mechanism for the recorder/reproducer apparatus is not actually a part of the present invention, and so is illustrated only in the most general manner. A particularly advantageous drive system is illustrated in my copending application Ser. No. 795,415, filed Jan. 31, 1969.

The aforementioned table or platform 18 of the upper section 12 establishes the position or level of the tape deck referred to in this specification, which phrase is broadly intended to describe the structural platform itself and the tape-handling means associated therewith (including a pair of drive spindles 38, the aforementioned tape guides 28, the tape head 26, etc.). More narrowly considered, this phrase refers to the support surface provided by the platform 18.

Figure 5:
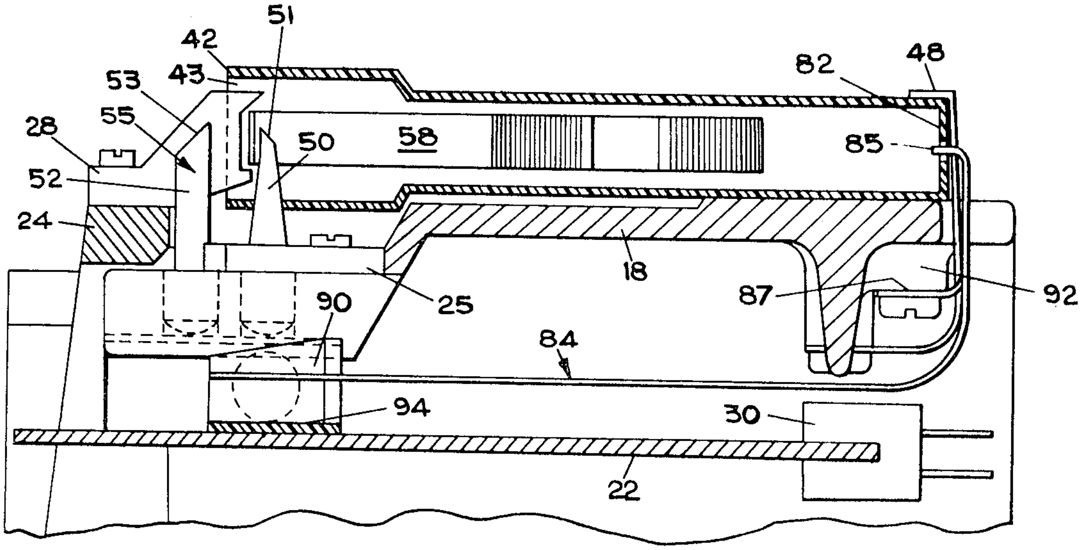
FIG. 5 is a sectional side elevation taken through the plane V–V of FIG. 4.

As illustrated in FIGS. 1, 4 and 5, a cassette-type tape cartridge 40 mounts atop the platform 18. As stated previously, the cassette 40 is a conventional piece of tape equipment which is widely available from audio equipment sources. The cassette has internal winding spool or reel means and a wholly-contained recording tape whose ends are secured to the reel means. Such reel means are customarily plastic or other spool elements having spindle-engagement teeth which protrude radially inward of openings 39 in the cassette, through which the spindles 38 are insertable. The tape within the cassette is guided past a front face 42 thereof (FIGS. 1, 4 and 5), in which a series of openings 43 is provided to permit the magnetic head and a number of tape guides to come into proximity with the recording tape enclosed within the cassette. Also, four apertures 44 (FIG. 1) are present in the upper and lower walls of the cassette, formed transversely thereof in the area immediately behind the front face 42. Two of these apertures receive fixed mounting posts which position the front of the cassette, while the other two such apertures are intended in conventional practice to receive a drive capstan, whose mating pinch roller contacts the tape through one of the front face openings 43 mentioned previously.

In accordance with the present invention, fixed mounting posts 46 (FIG. 2) are secured to the platform 18 to position the front of the cassette, and a pair of spaced relatively stiff spring clips 48 (FIGS. 1 and 5) are attached to the rear of the platform 18 to anchor the rear of the cassette and force it forwardly against the mounting posts 46. In the present invention the tape within the cassette is driven by the spindles 38, which thus assume far greater importance than is true in conventional cassette usage, in which these are merely takeup devices. This leaves the capstan-receiving apertures 44 vacant, and these apertures are utilized in the present invention to receive an upstanding light guide element 50 (FIGS. 2, 3 and 5) which, with a closely spaced similar guide element 52, monitors tape passing between the reel means and across the face of the recording head 26 (note FIGS. 3 and 5). The light guide elements 50, 52 are preferably parts of an integral structure 55 (FIGS. 2 and 5) having a supportive base portion 54 by which the structure is attached to the forward extremity of the tape deck platform 18, as by a mounting screw 56. The integral structure 55 is preferably of a light-conductive clear plastic material such as an acrylic monomer, and the upper extremity of each of the guide elements 50, 52, which are generally upright postlike or columnar elements, has an angular prismatic surface 51, 53, respectively, which should be polished and coated with a light-reflective material, such as by vacuum-deposited metalizing. While the overall shape of the element 52 is not particularly critical, the shape of element 50 is important, in that it must have a sufficiently small diameter as to readily pass through the aforementioned cassette aperture 44, and it must be sufficiently long as to extend upwardly within the cassette to a position immediately adjacent the recording tape 58 enclosed therein, as illustrated in FIGS. 3 and 5. The forward portion of the platform 18 beneath the guide elements 50, 52 of light post 55 is preferably cut away or recessed, as illustrated in FIG. 5, so that the bottom extremity 50*a*, 52*a* of these elements, which have a semispherical and configuration, is fully exposed to the underside of the platform, and to the circuit board 22 and the components mounted thereupon.

Figure 7:
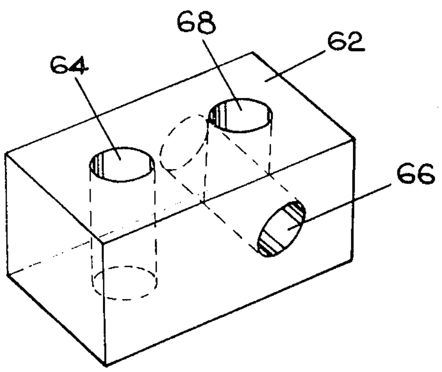
FIG. 7 is a greatly enlarged perspective view of an element of the optical system.

Referring to FIGS. 3 and 4, it will be observed that a pair of blocklike fixtures 60, 62 are mounted upon the upper surface of the circuit board, 22 in such a position that fixture 60 lies immediately beneath and in alignment with the light post 55 and fixture 62 lies beneath and in alignment with a point located radially of one of the spindles 38, which are disposed at the center of the reel means within the cassette 40 (see FIG. 3). Preferably, the underside of the tape deck platform 18 is configured to provide a pair of downwardly-depending bosses 61, 63 (FIG. 4), which are of saddle-shaped configuration and which fit closely over the fixtures 60, 62, respectively. Each of the fixtures 60, 62 is preferably of the general nature best illustrated in FIGS. 3 and 7, comprising a solid rectangular block of opaque material having a first transverse passage 64 (FIG. 7) extending vertically through the block, and a second somewhat similar passage 66 extending laterally through the block, generally midway between the top and bottom faces thereof, with a vertical passage 68 extending from the top surface of the block downwardly into communication with the lateral passage 66. This arrangement is basically true of both fixtures 60 and 62.

Referring to fixture 60, a light pickup or sensor such as a photocell 70 (FIG. 3) mounts upon the circuit board 22 within the lower extremity of the vertical passage of fixture 60 corresponding to passage 64, and a lamp-type light source 72 mounts within the lateral passage of this fixture corresponding to passage 66, such that light from the lamp is directed upwardly through the vertical passage 68. In the case of fixture 60, the boss 61 disposed immediately above this fixture is provided with a pair of spaced vertical passages 61*a* (FIGS. 4 and 5) which are in alignment with the vertical fixture passages corresponding to passages 64 and 68. These boss passages 61*a* are also in vertical alignment with, and receive, the bottom extremities 50*a*, 52*a* of the light post guide elements 50, 52. Due to the essentially nonreflective spherical end surfaces of bottom extremities 50*a*, 52*l*, and due to the reflective function of the angular prismlike surfaces 51, 53, respectively, it may be seen that light from source 72 will travel upwardly through vertical fixture passage 68 and through light guide element 50, that such light will reflect laterally from angular surface 51 of this guide element (which should have an angle of 45° if the two guide elements are generally parallel and of equal length), across the gap between light guide elements 50, 52, into light guide element 52, where the light is reflected downwardly from reflective surface 53, to travel down this guide element and down vertical fixture passage 64, to the light sensor photocell 70, that is to say, this path of light travel will occur if no tape is present between the light guide elements, or if the tape present therebetween is transparent, or substantially transparent; on the other hand, all of that portion of tape 58 which is receptive to the recording of information carries a generally opaque oxide or other such coating, which actually effects recording of the magnetic signals from the recording head 26. Therefore, if any such portion of the tape is between the light guide elements, there will be no light transfer between the light guides 50, 52, and the photocell 70 will not be activated.

Fixture 62 has its own light source 74 (FIG. 3) and photocell sensor 76, which mount in positions directly analogous to those mentioned with regard to fixture 60. In the case of fixture 62 and its cooperative boss 63, however, the arrangement is such as is illustrated in detail in FIG. 6. In this figure, the boss 63 is provided with a pair of spaced passages 63*a*, 63*b*, but these are upwardly convergent with respect to each other, and each such passage houses a light guide means in the form of a light-conductive tube or cylinder 76, 78, preferably of a clear plastic such as an acrylic monomer. Consequently, light from the source element 74 disposed within fixture passage 66 travels upwardly through the passage 63*a* of boss 63, is conducted upwardly through light tube 76, and is directed upwardly at an angle toward the cassette 40 positioned immediately above the platform 18, inasmuch as this boss is in effect an integral downwardly continuation of tape deck platform 18. All conventional cassettes include a substantially transparent viewing window 80 (FIGS. 1, 3 and 6) in each side of the case between the spindle openings 39. In the conventional applications of the cassette, this is merely to afford the audio listener a view of the amount of tape present on the tape reel means within the cassette, so that a rough approximation can be made of the amount of listening or recording time available at any given moment. In accordance with the present invention, the windows 80 are used in a much different manner. That is, light directed upwardly from light tube 76 in the aforementioned manner passes through the lowermost cassette window 80 and, if the tape wound upon the adjacent cassette reel is insufficient to block its further excursion, such light impinges upon the inside surface of the uppermost cassette window. Since these windows are, as stated, substantially transparent, much of this light passes upwardly out of the cassette; however, it has been found that a sufficient amount of light will be reflected from the inner surface of such cassette window as to be angularly displaced back downwardly, where it will enter light tube 78. This light will be conducted by the latter element back downwardly through passage **63*b* of boss 63, from whence it will enter vertical passage 64 of fixture 62, to activate the photocell sensor 76 at the bottom of such vertical passage. The orientation of light tubes 76 and 78 is such that the cassette spool or reel nearest it is monitored for the condition of a majority of the tape footage present within the cassette; that is, light will be transferred from source 74 to sensor 76** if this particular cassette reel contains less than a majority of the tape footage within the cassette, but such light passage will be blocked if the opposite condition is true.

A third optical sensing system is also provided in the apparatus of the invention. Basically, this comprises a light source and an appropriate pickup or sensor and a shutter or flag element which is movable between two conditions, in one of which light is transmitted from such source to such sensor, and in the other of which such transmission is blocked. The position of the shutter or flag element is determined by a feeler arm portion positioned by a wall of the cassette itself. By way of explanation, the commercial or conventional cassette recorder/producer has a switch-actuating mechanical feeler arm used to detect the presence or absence of a knock-out tab provided in the back or rear wall of the cassette case, illustrated by the numeral 82 in FIG. 5. The principle involved is to provide a way for locking out the recording and erasing capability of the recorder in certain selected instances, to avoid erasure of a particular recording. As stated, in the conventional application this function is provided by a mechanical arm which physically trips an electrical switch. In accordance with the present invention, the function is provided by an optical switching system.

Figures 6, 8:
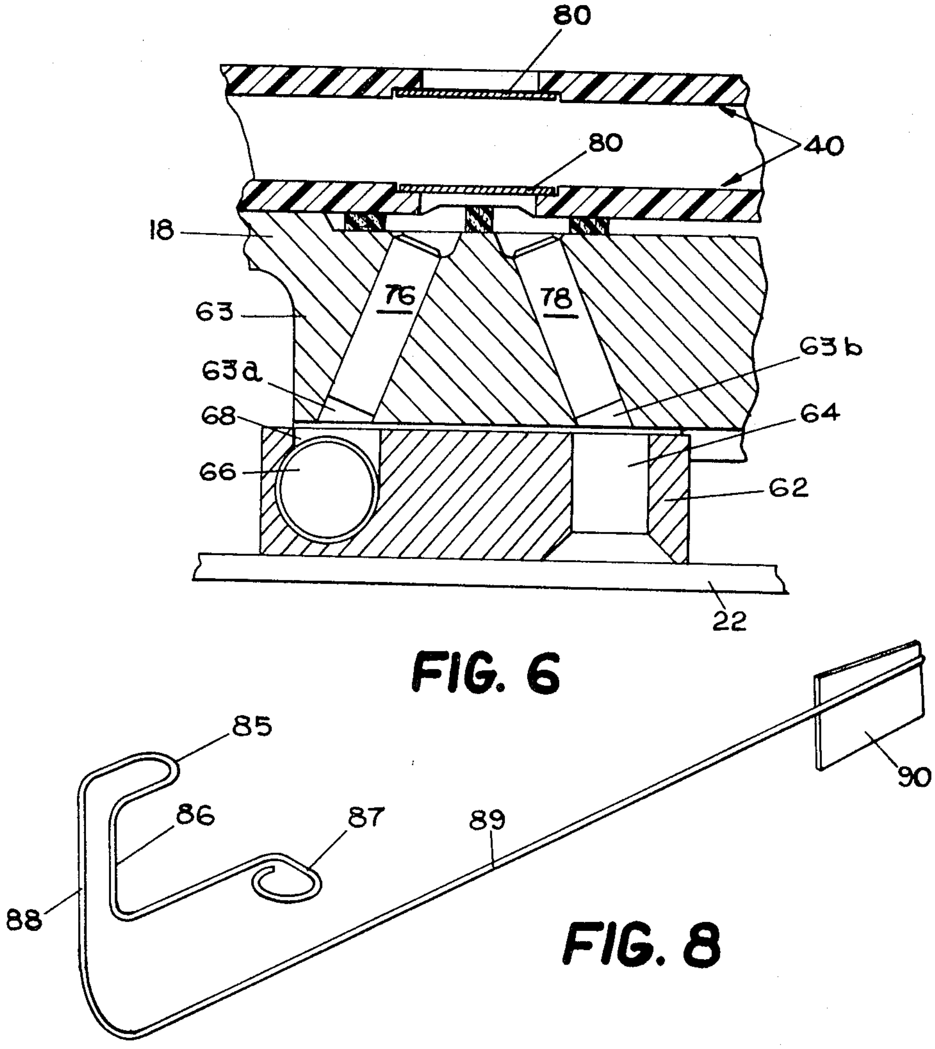
FIG. 6 is a sectional side elevation taken through the plane VI–VI of FIG. 4.
FIG. 8 is a greatly enlarged perspective view of another component of the optical system.

The elements of such optical switching systems are illustrated in FIGS. 3, 4, 5 and 8. Firstly, an integral feeler arm 84 is provided, made of a stiffly flexible wire or the like, such as conventional music wire. The particular shape of this arm is illustrated in FIG. 8, and includes an upper sensing portion 85 for contacting the rear wall 82 of the cassette, a downwardly-depending leg 86 forming an attachment ring 87 at its lowermost end, and a downwardly-depending leg 88 which merges with a forwardly-projecting arm 89, to the forward end of which is attached the aforementioned shutter or flag 90, which is of metal or other opaque material. As illustrated in FIG. 5, the feeler arm 84 is mounted by securing the attachment ring 87 to a boss 92 which depends downwardly from the tape deck platform 18. In this position, the shutter 90 is disposed near the forward edge of the circuit board 22, where a bifurcated or U-shaped fixture 94 is mounted, such that the shutter 90 is aligned centrally of this fixture. As best illustrated in FIG. 3, fixture 94 is generally U-shaped in cross section, having a central rectangular recess or passage in which the shutter may rest, and also having a transverse bore passage 96 extending through both of the upstanding legs of the U-shaped fixture. A light source 98 is mounted within passage 96 on one side of the shutter opening, and a light sensor or photocell 100 is mounted within the passage 96 on the other side of the shutter opening. The general operation of the shutter 90 will thus be apparent, i.e., in its downward position it serves to block transmission between source 98 and sensor 100, whereas in its upper position it permits such light transmission.

The manner in which the shutter 90 is raised and lowered can be seen from FIG. 5. That is, if the knock-out tab in the rear wall 82 of the cassette has been removed, the sensing portion 85 at the top of feeler arm 84 enters the rear wall of the cassette through the opening provided by removal of the tab, and the shutter remains in its normal downward position. However, if the tab is intact within the rear wall 82 of the cassette, the upper sensing portion 85 of the feeler arm contacts the rear wall and is pushed backwardly by full insertion of the cassette. Due to the resilient nature of the feeler arm, such rearward movement of feller arm portion 85 with respect to the feeler arm attachment ring 87 springs leg 86, thereby angling leg 88 with respect to the vertical and lifting arm 89, to cause elevation of the shutter 90 in an amount sufficient to permit light transmission across fixture 94. As will be understood, the photocell sensor 100 is connected in circuit such that when activated by light reception from source 98, normal recording operation of head 26 is permitted; when photocell 100 is not activated by received light, the tape head is disabled insofar as recording and erasure is concerned.

The particular system configuration in which the signals produced by operation of the light sensor photocells are utilized for control of tape drive and/or control of reproducing and recording functions may be implemented from any of several possible approaches which will be apparent upon consideration of the foregoing disclosure of the optical system itself. Inasmuch as the principal application of the present apparatus is intended to be in the field of data entry and electronic data processing, it is contemplated that the signals from the photocells will be coupled to a logic unit which will initiate control commands in response to the signals themselves; however, it will be apparent that a very modest or even rudimentary gating arrangement could be used to effect control of tape recording or reproducing functions, for example, in response to the signals from the two photocells 70 and 76, while direct solid state or other electronic switching can be used to implement use of the control signal from the record lockout photocell 100.

The great utility of the present control system should now be apparent. The optical switching involved provides instantaneous and direct sensing and control functions without physical contact with or modification of the tape, and the particular implementation of the optics is highly advantageous and unique, particularly in connection with utilization of cassette-type tape magazines. In such an application, the recorded bit density is likely to be on the order of about 800 bits per inch; moreover, the binary-form data is recorded on the tape serially, in clocked form, with each bit having a precise time interval which may be on the order of 400 microseconds. Consequently, the absolute necessity for precision replay and tape position control will be readily appreciated, and this precision is provided by the present invention.

It is entirely conceivable that upon examining the foregoing disclosure, those skilled in the art may devise particular embodiments of the concepts forming the basis of the invention which differ somewhat from the preferred embodiment shown and described herein, or may make various changes in structural details to the present embodiment. Consequently, it is to be recognized that the preferred embodiment shown and described is for purposes of general illustration only and is in no way intended to illustrate all possible forms of the invention.

The embodiments of the invention in which an exclusive property or privilege is claimed are defined as follows.

1. Tape recorder/reproducer apparatus having optical tape sensing means, comprising: tape deck means, including means for moving recording tape lengthwise along a predetermined path; means for directing light to said tape, including a source, light-angulating means for guiding light from said source along an angular path intercepting the tape, and light-pickup means for receiving at least some of the light intercepting said tape; said pickup means being responsive to predetermined gradations of light representative of predetermined tape presence conditions at the area of interception to produce a control signal in accordance with such conditions; and said means for directing light including a generally straight, columnar light-conducting post and a member aligned with and spaced from said post to define a gap therebetween through which said tape is moved, said guided light intercepting said tape within said gap; said tape deck means being particularly adapted for use with recording tape mounted within cartridges of the type having an outer case which houses tape winding spool means and which substantially encloses the tape, and said tape deck means having mounting means for holding such cartridge in a predetermined position; said columnar post element having an upstanding portion of a diameter sufficiently small to removably pass through an aperture in such case when the cartridge is held in its said predetermined position to thereby position the end extremity of such portion inwardly of the case with respect to at least a segment of the tape contained therein.

2. The apparatus of claim 1, wherein said post member has a reflective surface for changing the angle of light passing across said gap.

3. In combination, a recording tape cartridge and tape recorder/reproducer apparatus for removably mounting such cartridge and recording or reproducing messages on its tape, said apparatus having an optical tape sensing and control means; said cartridge including a housing case enclosing a length of tape and having at least one aperture in the case positioned generally adjacent a portion of such tape; said optical means including means for establishing a light beam across the path of said tape within said case: such means including a source of light, photoreceptive means for receiving light from said source and providing a signal in response thereto, and means for guiding light from said source to said photoreceptive means; said light guide means including a light-conducting free-standing post mounted on the recorder/reproducer apparatus in a projecting attitude, and said post being of such size and shape as to be removably insertable through one of said apertures in said case when the cartridge is mounted in place upon the recorder/reproducer apparatus; and means for mounting said cartridge in place upon said apparatus so that said post passes through said aperture and into the interior of said case in lateral alignment with the tape contained therein.

4. The combination of claim 3, wherein said post includes a light-conductive solid portion.

5. Tape recorder/reproducer apparatus having optical tape sensing means, comprising: tape deck means for moving recording tape lengthwise along a predetermined path, and including tape-winding reel means; means for directing light toward said reel means along a path angularly disposed to the plane of rotation thereof and intercepting such plane at a position spaced laterally from the rotational center of the reel means; reflector means for reflecting light directed to said plane of said reel backward in a generally opposite direction and light-pickup means positioned on the same side of said plane as said light-directing means, for receiving at least some of the light so reflected; said pickup means being responsive to predetermined gradations of light representative of predetermined tape presence conditions at the area of interception to produce a control signal in accordance with such conditions and representative of the quantity of tape present upon such reel means; said tape deck means including a magazine enclosing said tape and said reel means, said magazine having a viewing window for visual examination of the enclosed tape, said reflector means comprising at least one surface portion of said viewing window.

6. Sensing and control means for tape recorder/reproducer apparatus of the type having a pair of tape-winding reel means and drive means for moving recording tape from one to the other of said reel means and past a predetermined point, said sensing and control means comprising in combination: means for monitoring said tape as it is moved past said predetermined point and for detecting the presence at such point of a predetermined part of such tape; and means for monitoring the amount of tape present on at least one of said reel means; each of said monitoring means including means for producing control signals which together are indicative of the presence at said point of a particular segment of said tape.

7. The sensing and control means of claim 6, wherein at least one of said monitoring means comprises an optical system utilizing light impinged upon said tape.

8. The sensing and control means of claim 7, wherein said optical system includes a source, a light sensor, and light-angulating means for guiding light along an angular path between said source and said sensor.

9. The sensing and control means of claim 8, wherein said light-angulating means guides said light along an angular path between said source and said tape.

10. The sensing and control means of claim 8, wherein said light-angulating means includes a pair of light guide elements spaced apart sufficiently to permit said tape to pass between them.

11. The sensing and control means of claim 10, wherein at least one of said elements has a postlike portion arranged to extend generally transversely of the longitudinal axis of said tape and having a surface disposed generally parallel to the plane of the tape.

12. The sensing and control means of claim 11, wherein such means is particularly adapted for use with recorder/reproducer apparatus of the type using tape magazine cartridges having a tape-enclosing case and an aperture in the case providing access to the tape enclosed therein, said postlike portion comprising an elongated member of sufficiently small cross section as to be insertable through such aperture and of sufficient length as to extend to a point within the case adjacent the tape.

13. The sensing and control means of claim 7, wherein said optical system includes a source and a light sensor disposed on the same side of said reel means, and further includes a light-reflecting member disposed on the opposite side of said reel means to return light emanating from the source back to the sensor.

14. Tape recorder/reproducer apparatus having optical tape sensing means, said apparatus comprising: frame means defining a tape deck and including a pair of supports for mounting a pair of tape reel means in generally coplanar relation; support means including a component-carrying platform means disposed in general parallel and spaced relation beneath said tape deck and the plane of said reels; at least one light source and a pair of light sensor elements, said sensor elements and said light source all carried by said platform means; and light guide means between said source and each of said sensor elements, one of said guide means for guiding light from said source to a segment of said tape between said reel means and back to one of said sensors, and the other of said guide means for guiding light from said source to tape wound upon one of said reel means and back to the other of said sensors, for monitoring tape presence conditions on said tape deck.

15. The apparatus of claim 14, wherein said one light guide means includes an upstanding postlike guide element having a portion extending to a position adjacent said tape.

16. The apparatus of claim 14, wherein said other light guide means includes a pair of upwardly extending guide-defining portions having end portions communicating through said tape deck and disposed immediately beneath the position occupied by tape wound upon one of said reel means.

17. The apparatus of claim 16, wherein said one light guide means includes an upstanding postlike guide element having a portion extending to a position adjacent said tape.

18. The apparatus of claim 17, wherein said light guide means includes a pair of said guide elements having portions spaced apart and positioned on opposite sides of said tape, said elements arranged to direct light across said spaced portions and against a tape therebetween.

* * * * *